Sept. 26, 1950     H. W. KLEIST     2,523,956
BLOCK FREEZING UNIT

Filed Jan. 18, 1947     2 Sheets-Sheet 1

Inventor
Herman W. Kleist
by Parker & Carter
Attorneys

Sept. 26, 1950     H. W. KLEIST     2,523,956
BLOCK FREEZING UNIT
Filed Jan. 18, 1947     2 Sheets-Sheet 2
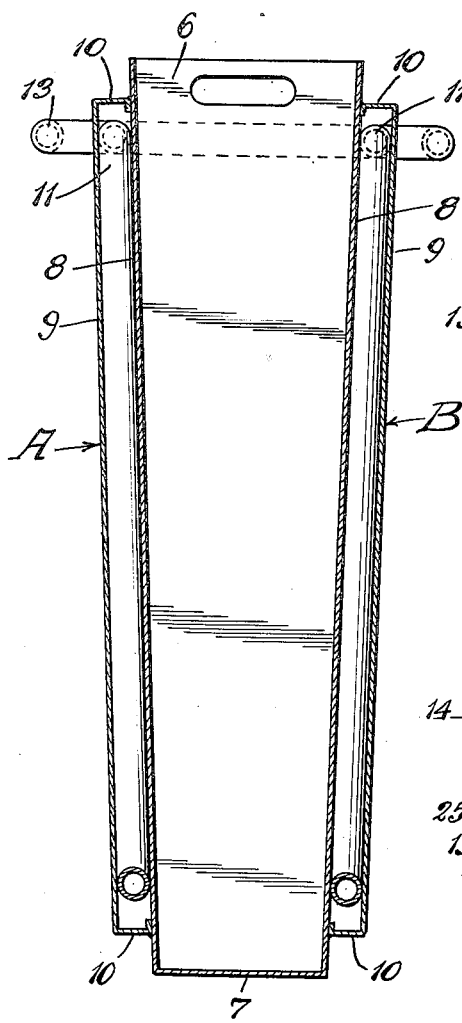
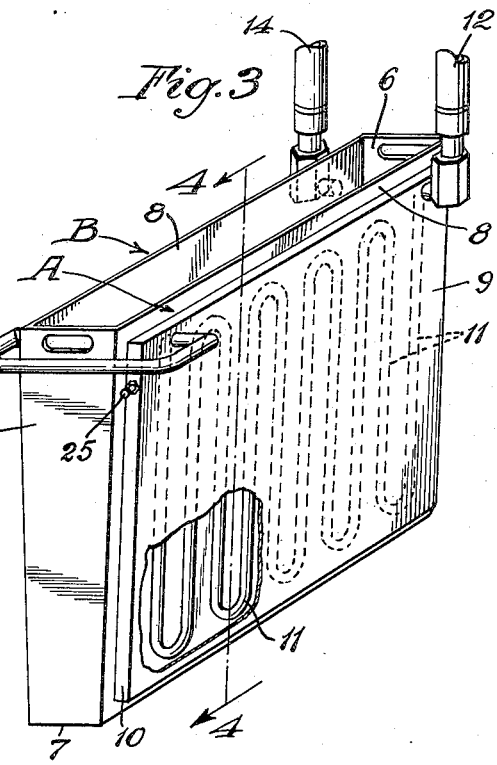
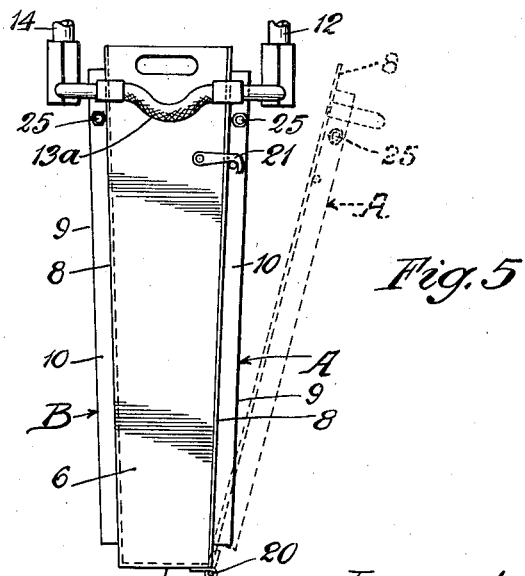
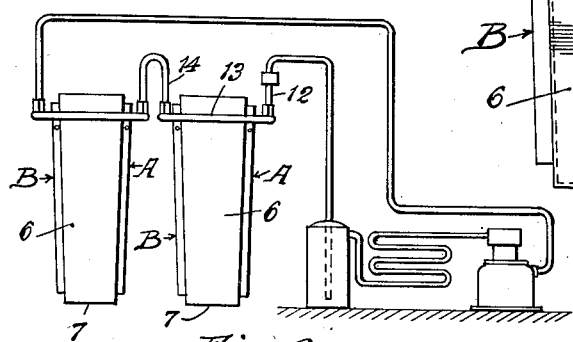
Inventor
Herman W. Kleist
by Parker & Carter
Attorneys Patented Sept. 26, 1950

2,523,956

UNITED STATES PATENT OFFICE 2,523,956

BLOCK FREEZING UNIT

Herman W. Kleist, Chicago, Ill., assignor to Dole Refrigerating Company, Chicago, Ill., a corporation of Illinois Application January 18, 1947, Serial No. 722,895

4 Claims. (Cl. 62—158)

My invention relates to an improvement in block freezing units and has for one purpose to provide an improved unit in which various substances may be frozen.

Another purpose is to provide an improved mechanism for freezing blocks of ice.

Another purpose is to provide an improved unit for freezing foodstuffs, including but not limited to fish.

Another purpose is to provide an improved block freezing unit which includes opposite and relatively movable freezing elements.

Other purposes will appear from time to time in the course of the specification and claims.

I illustrate the invention more or less diagrammatically in the accompanying drawings wherein:

Figure 3 is a perspective view of a single unit;

Figure 4 is an enlarged section taken at line 4—4 of Figure 3;

Figure 5 is an end elevation of a variant form; and

Figure 6 is a cycling diagram.

Like parts are indicated by like symbols throughout the specification and drawings.

Figure 2:
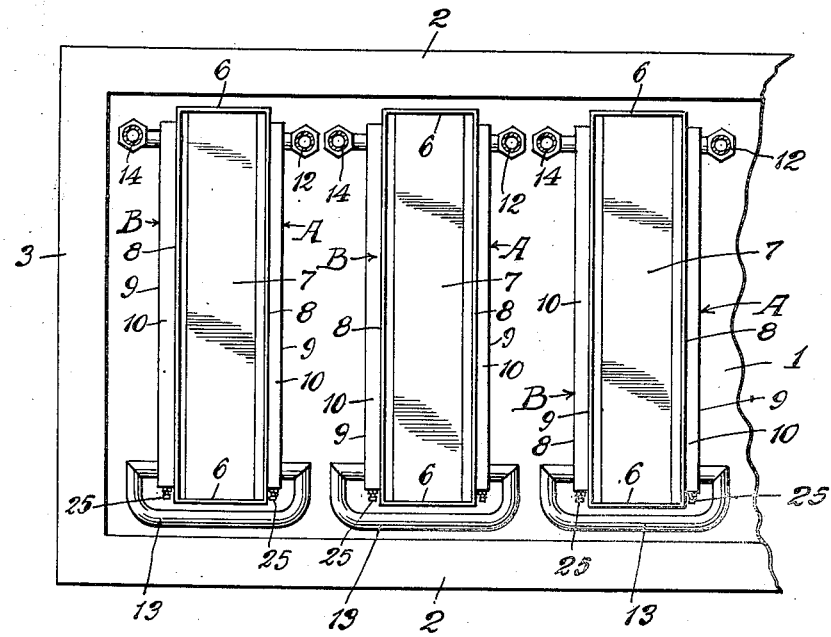
Figure 2 is a plan view of the structure shown in Figure 1.
Figure 1:
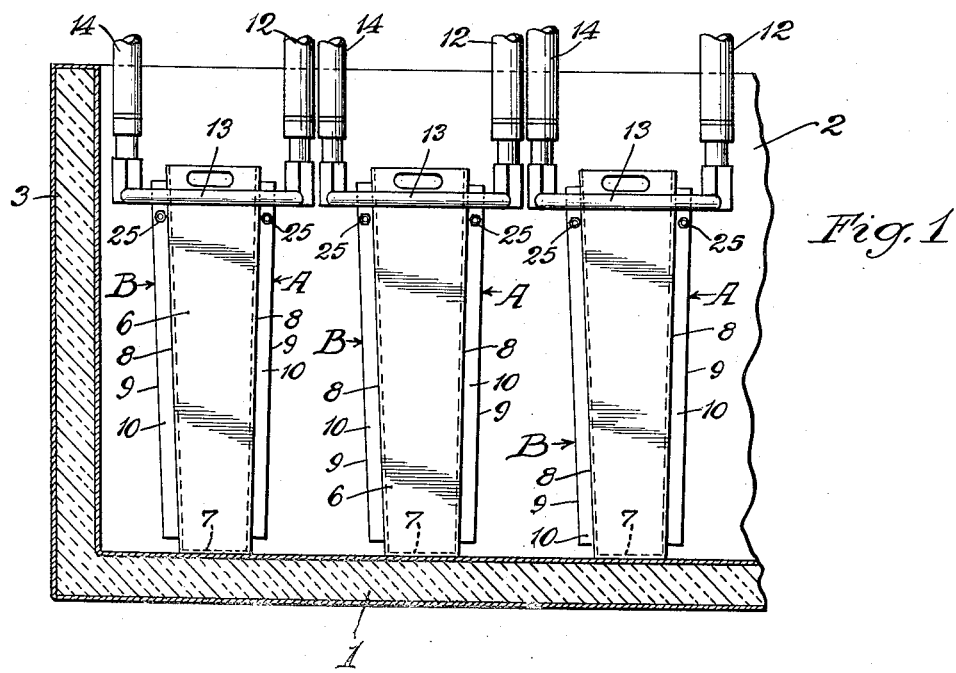
Figure 1 is a vertical section with parts in elevation.

Referring to the drawings, I illustrate an outer insulating container which may have the bottom wall 1, side wall 2 and end walls 3. During the freezing operation, any suitable insulating cover may be employed.

Within the space surrounded by the insulating walls, I may position a series of freezing units, of which a typical unit is illustrated in perspective in Figure 3. Each such unit may include opposite refrigerating plates A and B connected by end walls 6 and by a bottom wall 7. Each plate includes an inner side wall 8, an outer side wall 9 and circumferential connecting walls 10. As a matter of convenience, the wall 8 may be of somewhat greater over-all width and length than the wall 9, as will be clear from Figure 3, the walls 8, 9 and 10 defining a space which may, if a vacuum, be completely sealed from atmospheric air. Located within the space thus defined is any suitable coil 11, shown, for example, in dotted line in Figure 3. It will be understood that any suitable volatile refrigerant, including but not limited to Freon, may be cycled through the coil 11, which serves as an evaporator. The result is the abstracting of heat from substances exposed to the plate. Any suitable means for cycling the refrigerant may be employed, not herein shown in detail, as they do not of themselves form part of the present invention. As to the individual units, such as the one shown in Figure 3, 12 may constitute a refrigerant supply line, which receives refrigerant from any suitable condenser, not herein shown, the condenser receiving a refrigerant from any sutiable compressor, not herein shown. Any suitable means may be employed for causing a pressure drop of the refrigerant as it is supplied to the coil 11. The refrigerant from the plate A may pass by the duct 13 to the coil 11 of the plate B. 14 is any suitable outlet duct through which the refrigerant may flow from the plate B. Preferably the ducts 12 and 14 are flexible to permit the insertion and removal of the individual units into and from the above-described housing. It will be understood that the individual units or plates may be connected in any suitable arrangement to the source of volatile refrigerant. Some or all of the units may be arranged in series, with appropriate pressure reduction means for maintaining a substantially uniform temperature in the various units, or for maintaining a predetermined variation of temperature in the various units. It will also be understood that the individual units may be arranged in parallel, with each duct 12 constituting a liquid refrigerant supply line, and each duct 14 constituting a vapor or low pressure return line to the compressor.

Whereas in the form of Figure 3 the two plates A and B, with their end and bottom walls, constitute a box or cell in which the walls maintain a constant relation to each other, in Figure 5 I illustrate a unit which is substantially identical with the unit of Figure 3, except for the employment of a pivotal connection between the plates A and B which permits them to be moved relatively toward and away from each other. As a matter of convenience, I illustrate pivots 20 at the lower corners of the plate A, the end walls 6 and the bottom wall 7 being shown as secured in relation to the plate B. The plates A and B may then be connected by a flexible passage 13a, which permits relative movement of the two plates. Any suitable latch means 21 may be employed for normally holding the plates A and B at their closest approach.

It will be realized that whereas I have described and claimed a practical and operative device, nevertheless many changes may be made in size, shape, member and disposition of parts without departing from the spirit of my invention. I therefore wish my description and drawings to be taken as in a broad sense illustrative or diagrammatic rather than as limiting me to my specific showing. For example, I find it advantageous to employ vacuum plates and I illustrate, as in Figure 3, fittings 25 which permit the withdrawal of air from the space within the plate, to create a partial vacuum. The result is to cause atmospheric pressure to press the plates 8 and 9 together against the coil 11, thereby obtaining a suitable heat transfer contact between coil and plate. It will be understood, however, that any suitable fins or spacing means, not herein shown, may be employed in connection with the coil. It will further be understood that the specific plates herein shown may, under some circumstances, advantageously be replaced by other types of plates, with or without the vacuum feature. For example, instead of employing vacuum plates, I may employ plates in which any suitable coil is welded or otherwise secured directly to a plate.

The use and operation of my invention are as follows:

In freezing blocks of ice, I may advantageously employ a plurality of cells, such as are shown in Figure 3. These cells may be inserted in a surrounding insulating wall, such as the walls 1, 2 and 3. The cells, when filled with water, and when the plates of the cells are connected with any suitable refrigerant circulating or cycling system, freeze water and other liquids into blocks of ice. The blocks may be freed from the cells, for example, by circulating hot water or air about the exterior of the cell.

In freezing foodstuff, such, for example, as fish, it is advantageous to have a cell in which some of the components or side walls are relatively movable. I thus provide the form of Figure 5 in which the side walls or freezing plates A and B are pivotally connected, as at 20. Thus, after the material has been frozen in the cell, the plates can be separated and the material readily withdrawn. It will be understood that the material to be frozen may be in direct contact with the plates or cell walls. It also may be advantageous to pack the material temporarily or permanently in some layer of material, paper or the like, which separates it from the plates or walls, and prevents undesired adhesion.

It will be understood that any suitable cycling arrangement may be employed, but Figure 6 diagrammatically illustrates a practical connection.

It will be understood that any suitable means may be employed for providing or controlling the pressure of the volatile in the coils of the plates A and B, whereby the effective temperature of the plates is controlled. Since means for that purpose are well known, and do not of themselves form part of the present invention, they are not illustrated herein.

I claim:

1. In a freezing assembly, an open-topped freezing cell including side walls, end walls and a bottom wall, said walls constituting an open-topped mold, each side wall including a plate structure having an outer wall element and an inner wall element, the wall elements of each plate structure lying in generally parallel planes and being connected around their edges to define an interior sealed from the atmosphere, a coil in the interior of each plate, and inlet and outlet pipes for each plate structure adapted for the circulation through each coil of a volatile refrigerant, the end walls being of slightly trapezoid form and the side walls diverging slightly apart toward the open top of the cell.

2. In a freezing assembly, an open-topped freezing cell including side walls, end walls and a bottom wall, said walls constituting an open-topped mold, each side wall including a plate structure having an outer wall element and an inner wall element, the wall elements of each plate structure lying in generally parallel planes and being connected around their edges to define an interior sealed from the atmosphere, a coil in the interior of each plate, and inlet and outlet pipes for each plate structure adapted for the circulation through each coil of a volatile refrigerant, one side wall being hinged along its lower end to the cell and securing elements adapted normally to hold it fixed in closed position in relation to the cell.

3. In a freezing assembly, an open-topped freezing cell including side walls, end walls and a bottom wall, said walls constituting an open-topped mold, each side wall including a plate structure having an outer wall element and an inner wall element, the wall elements of each plate structure lying in generally parallel planes and being connected around their edges to define an interior sealed from the atmosphere, a coil in the interior of each plate, and inlet and outlet pipes for each plate structure adapted for the circulation through each coil of a volatile refrigerant, the two side plates of the cell being connected in series, and a flexible tubular connection between the outlet pipe of one plate and the inlet pipe of the other.

4. In a freezing assembly, an open-topped freezing cell including side walls, end walls and a bottom wall, said walls constituting an open-topped mold, each side wall including a plate structure having an outer wall element and an inner wall element, the wall elements of each plate structure lying in generally parallel planes and being connected around their edges to define an interior sealed from the atmosphere, a coil in the interior of each plate, and inlet and outlet pipes for each plate structure adapted for the circulation through each coil of a volatile refrigerant, at least one side wall being mounted for movement in relation to the other walls, and securing means adapted normally to hold it in closed position in relation to the other walls.

HERMAN W. KLEIST.

REFERENCES CITED

The following references are of record in the file of this patent:

UNITED STATES PATENTS

| Number | Name | Date |
| --- | --- | --- |
| 177,845 | Jas | May 23, 1876 |
| 896,594 | Smith | Aug. 18, 1908 |
| 1,130,960 | Carter | Mar. 9, 1915 |
| 1,748,101 | Bentley | Feb. 25, 1930 |
| 2,217,702 | Kleist | Oct. 15, 1940 |
| 2,223,159 | Vose | Nov. 26, 1940 |